Nov. 24, 1953 | L. W. PARKER | 2,660,684

ELECTRONIC COLOR TELEVISION

Filed Feb. 6, 1948 | 2 Sheets-Sheet 1

INVENTOR
Louis W. Parker
BY
[signature]
ATTORNEY

Nov. 24, 1953 L. W. PARKER 2,660,684

ELECTRONIC COLOR TELEVISION

Filed Feb. 6, 1948 2 Sheets-Sheet 2

INVENTOR
Louis W. Parker
BY
ATTORNEY

Patented Nov. 24, 1953 2,660,684

UNITED STATES PATENT OFFICE 2,660,684

ELECTRONIC COLOR TELEVISION

Louis W. Parker, Little Neck, N. Y., assignor to International Standard Electric Corporation, New York, N. Y., a corporation of Delaware Application February 6, 1948, Serial No. 6,641

3 Claims. (Cl. 313—67)

This invention relates to television and more particularly to improvements in electronic deflection systems for controlling the scanning of a color grid screen within a cathode ray tube for the production of television images in natural colors.

Color television systems have been proposed in which the image is formed upon a cathode ray tube screen having a plurality of screen areas insulated from each other, with groups of these areas coated with different fluorescent materials, so as to produce different colored illumination. The electron beam of the tube is caused to fall at any given instant upon a particular screen area which will produce the desired colored light by giving that area a suitable positive potential. Usually three fundamental colors are thus produced in such rapid succession that they seem to mix and create all the possible colors. Such a system has the disadvantage that the fluorescent screens are difficult to make and can not be used for a black and white picture.

An object of this invention is to provide an improved electronic optical system for cathode ray tubes employing color grid screens.

Another object of this invention is to provide a method for eliminating the separating of colors on fast moving objects.

Another object of this invention is to provide a color screen in which the fluorescent screen illuminates white.

Another object of this invention is the reduction of the time between the transmission of the image signals for the three primary colors of the picture.

A further object of this invention is to provide a method which makes possible the use of black and white receivers on color signals when these receivers are adjusted to black and white standards.

A more detailed description of the invention follows and is illustrated in the accompanying drawing.

Fig. 1 schematically illustrates a cathode ray tube with the special screen arrangement;

Similar reference characters on the different drawing figures refer to corresponding parts.

Figure 1:
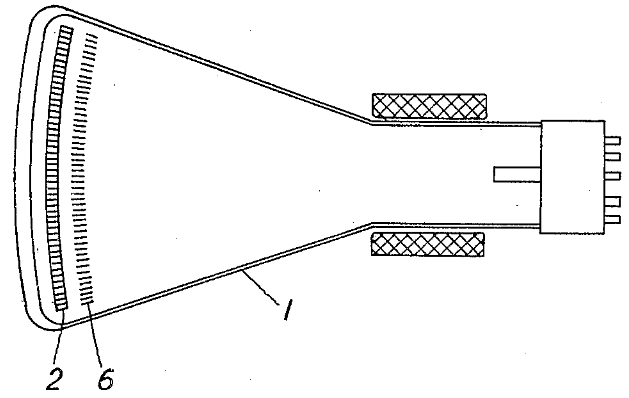

Fig. 1 illustrates a cathode ray tube 1 with the special screen arrangement to reproduce colored pictures. The tube in its construction resembles a conventional kinescope except for this screen 2 and associated grid systems 6.

Figure 2:
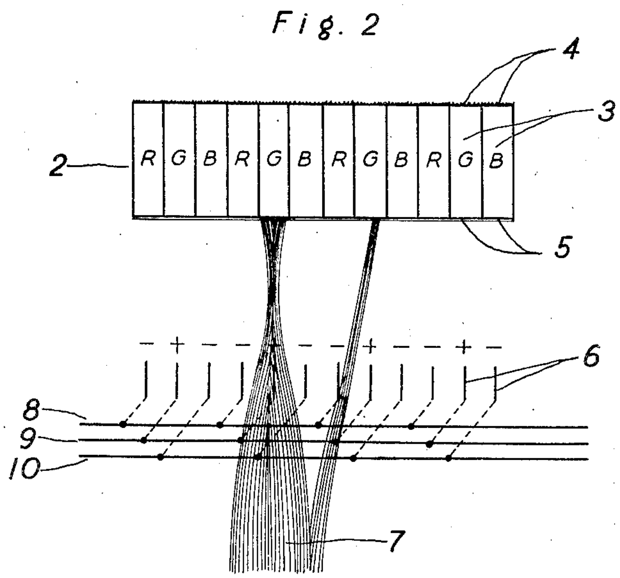
Fig. 2 shows details of the sceen and of a scanning arrangement employing grid deflection electrodes.

The details of the screen 2 and the grids 6 for controlling the scanning electron beam 7 are shown in Fig. 2. In this figure the screen 2 is built up of a pile of light filters such as colored glass slabs 3. Each slab is about .005 inch thick and is made to pass one of the three primary or fundamental colors. They are marked R, G, and B corresponding respectively to primary colors red, green, and blue. On the outer side of these slabs thin grooves 4 are formed along the length of the slabs, such as may have been made by rubbing sandpaper on the glass in a straight line, to cause light diffusion. On the inner side is a fluorescent white screen 5.

Paralleling the inner side of this color screen 2 are interlaced grid systems consisting of ribbon electrodes 6 insulated from each other but with every third ribbon connected together in parallel by conductors 8, 9, and 10, and to an outside source of variable potential. Electron beam 7 is as wide as three glass slabs or three grid spacings as it approaches the grids. When every third grid ribbon is connected to a few volts of positive potential and the other two sets or groups of ribbons to a few volts of negative potential, with respect to the second anode of the tube, then the electrons passing between the grids will be deflected towards the positive grids as shown. With the proper deflecting potentials it is possible to concentrate the electron beam on any one of the screen slabs. This action is illustrated in Fig. 2 where the beam 7 is concentrated on a green slab. It is obvious, that with the changing of the positive potential to another ribbon on the grid, the beam can be concentrated on any of the other color slabs.

Looking at the color screen from the outer side 4 the luminous spot appears on its outer surface due to the diffusing effect of the scratched or frosted surface of the glass. Without this diffusion at the outer surface, the light would be visible only over a narrow angle. Another way to increase this angle is to use quartz instead of glass and have a thin layer of binding material between the slabs, with a different coefficient of reflection. If coloring quartz is difficult, glass may be used with a thin layer of mirroring on one side. Both of these methods conduct the light to the outer side of the screen and emit it over a wide angle. This method is more efficient with light than sandpapering the surface, but sandpapering tends to mix the colors so the eye does not separate them so well in close range.

In the manner stated above one frame of the picture may be scanned in one color. By applying the square top waves from an outside source to the various deflecting grids, the color of the picture image can be changed to correspond to any of the three primary colors.

Varying amounts of D. C. potentials impressed on these grids cause the electron beam 7 passing between grid elements to concentrate and impinge on the fluorescent material 5 on any one of the light filter elements 3. This outside source of potential serves the purpose of switching the electron stream from one grid to the other. Each square top wave has a duration of one picture frame, for example $\frac{1}{120}$ second. The positive potential on deflecting grids 6 serves as conventional accelerators used in CR tubes.

An important advantage of this invention is the fact that the luminescence of the fluorescent screen is white, while previous methods require screen materials capable of fluorescing in the fundamental colors.

Figure 3:
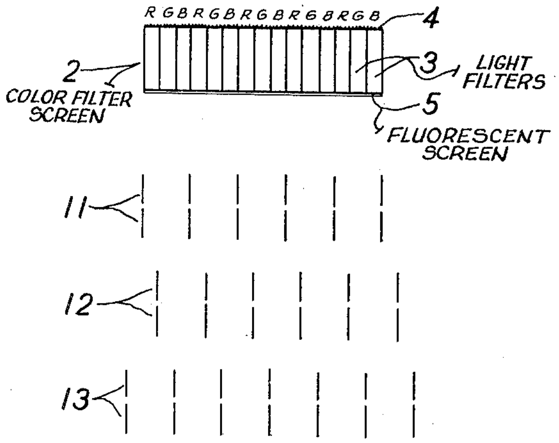
Figs. 3 and 4 show a modified screen scanning arrangement employing electron lenses.
Figure 4:
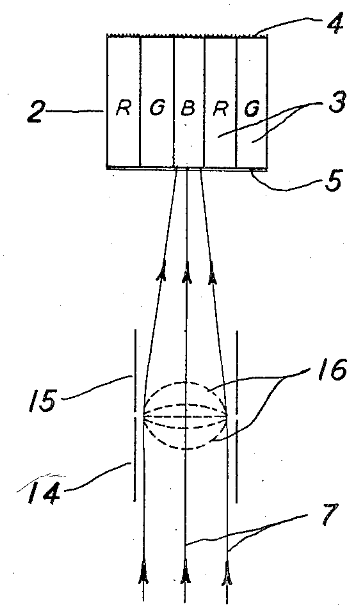

While the arrangement described above will work efficiently, the mechanical difficulties of the interlaced grid systems with the grid line elements closely spaced as shown in Figs. 1 and 2 may make the tube rather expensive. A simpler method for accomplishing the same result almost as efficiently, is illustrated in Figs. 3 and 4. In these figures the colored glass screen 2 is retained exactly as in Fig. 2, but instead of using grid deflection plates for confining the beam, three sets of electron lenses 11, 12, and 13 are used. The operational details of these lenses are shown in Fig. 4. Grid 14 is assumed to have the same potential as the second anode, while grid 15 is about 100 volts above it. According to well known laws, a curved set of equipotential lines 16 are developed between the grids having the potential difference. These lines act as curved boundaries for the electron beam passing between the grids and tend to inwardly bend the path of the electrons, that are outside the center axis, towards the axis. In the axis of this electron lens is located one of the color filters of the screen 2. A beam of electrons 7 swept laterally will be concentrated into narrower beams, which remain stationary over a short period, then rapidly disappear only to reappear at the next screen slab of the same color. These electron lenses therefore act like a set of optical cylindrical lenses would with a light beam. Three such sets 11, 12, and 13 of electron lenses longitudinally spaced and laterally displaced with respect to each other are used as shown in Fig. 3. They are displaced ⅓ of a picture element apart. Any set of the lenses will function properly if the potential on the other two sets is zero with respect to the second anode of the tube. It is necessary of course to use a voltage wave of higher amplitude on the set nearer the screen in order to focus the beam a shorter distance away. With this method of positioning the grid elements of the lenses the insulation problem all but disappears and the manufacturing accuracy of the grids may be relaxed.

In addition to eliminating moving parts, the system described herein is also able to correct another, perhaps the greatest disadvantage of the mechanical system. In such systems an image of a fast moving object is produced in the picture in separate parts, each of these parts having a different color. For example a pitched baseball looks like three distinct balls of red, green, and blue colors. In a certain electronic color system this trouble is overcome by transmitting all three colors simultaneously. The system using rotating color filters is fundamentally unable to accomplish this except when picking up the picture from a film. In that case the picture stands still long enough to transmit all three colors. Considering the fact that direct pick up will make up most of the colored television programs, this feature of this invention is one of its improvements over systems suffering from such image displacement disadvantage.

It is also a purpose of this invention to eliminate the disadvantage resulting from the comparatively long time between the transmission of the three fundamental colors.

The various modification systems that can be realized from the teachings of this invention as illustrated in the above figures can be used two ways. One way would be the conventional method of transmitting one color frame lasting perhaps for $\frac{1}{120}$ second, followed by another frame of different color, for the same length of time. In this way the performance would be very much like that of the mechanical filter system. A second way however is to transmit three colors a short time, such as $\frac{1}{12}$ of a micro-second apart. In this way each point on the picture is transmitted three times, before the next point is treated similarly. The greatest color displacement on a fast moving object becomes that of ⅓ picture element.

Figures 5, 6:
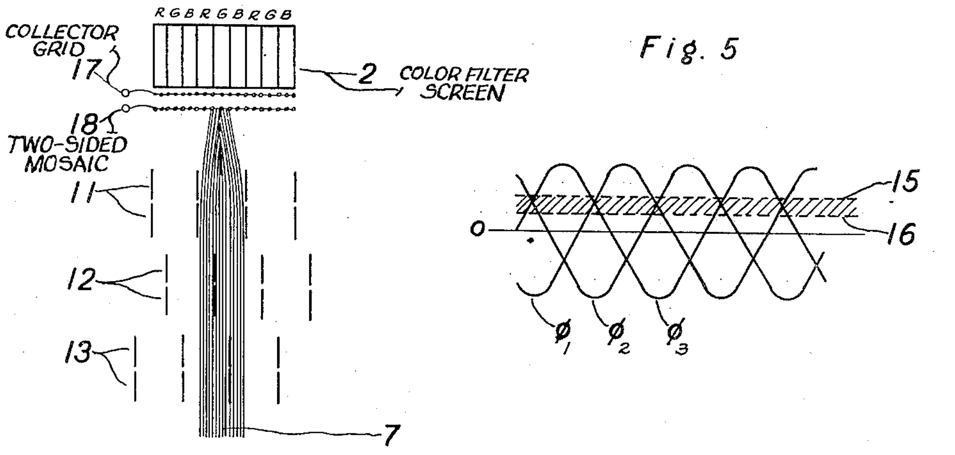
Fig. 5 shows curves of three phase voltage waves for producing electron lens focusing potentials.
Fig. 6 illustrates tube alterations for employing the principles of this invention in pick up transmitting equipment.

In using this latter mode of transmission the sweep standards may be made the same as for black and white pictures. For example, with 525 lines, 60 frames, and 30 pictures per second. The synchronizing pulses may also be similar, but there is a need for an additional synchronizing means. Electronic lenses used for changing colors require an A. C. potential, having the frequency of perhaps 4 megacycles, which must be kept in synchrony with a similar A. C. on the transmitting end. Since there are three sets of electronic color lenses, there is a need for three phases of this A. C. voltage. It is proposed that this 4 mc. three phase voltage be clipped as shown in Fig. 5. In this figure the three phases $\phi_1$, $\phi_2$, $\phi_3$, represent the three A. C. voltage waves. These waves are clipped in such manner that only the shaded part 15, 16 of the waves as shown in the figure, is passed to create a corresponding potential difference across a resistance. This potential is used for focusing. Each color lens group receives one of the phases and the amplitude of the wave is adjusted with a suitable voltage divider for proper focus just before applying it to the lens.

The problem of synchronizing this A. C. potential can be solved a number of ways. One simple way is to transmit the 4 mc. wave during the sweep return time. Sound may also be transmitted at the same time but on a sub-carrier of different frequency. This 4 mc. may be applied to an oscillator having an accuracy within .05 per cent. If we assume that sweeping one horizontal line takes 57 microseconds and the return time is 6 microseconds then the number of waves during sweeping is $4\times57=228$ and during the return time $6\times4=24$ cycles. The maximum possible shift of phase during sweeping, within .05 per cent accuracy is 0.114 cycle or about 41 degrees. This much shift is permissible, since the difference between colors is 120 degrees. The accuracy within .05 per cent can be maintained without any crystal control, providing a vernier adjustment is available to the operator. This is a simple adjustment since all the operator has to do is to turn it until the color becomes the same throughout the picture on similar subjects. During the return time the phase of the oscillator is readjusted to correspond to the phases used at the transmitter. Identification of the phase used with each of the three colors is done by making the transmitted phase correspond to a given color, say green. This phase is then shifted ahead 120 degrees for red and back 120 degrees for blue.

Since this color synchronizing pulse is practically the only difference between the color and black and white transmission, it is entirely feasible to receive the color signals with a standard black and white receiver. This can be done with good quality and with no change in equipment other than what is necessitated by a different region of the R. F. spectrum. A one tube frequency converter added to such receiver enables it to be used with full efficiency when color transmitters come on the air. This eliminates the financial losses that would inevitably be suffered by the public due to the transition of black and white to color systems.

The transmitting equipment used with the above described color system requires an alteration similar to that made on the CR tube shown in Fig. 1. A special type of iconoscope or some other similar pick up device must be used and the electron stream passed through electron deflectors as are shown in previous figures.

Fig. 6 illustrates the principle of a pick up device meeting the above requirements. It is fundamentally an iconoscope of the type where the light is applied on the outer side of a mosaic plate while the electron stream impinges on the inner side. Such an iconoscope pick up with two sided mosaic is well known but in the arrangement shown herein it is replaced by the conventional type with certain modifications, on account of its greater cost due to more elaborate construction.

In Fig. 6 only the parts of the iconoscope near the mosaic are shown. All other parts are conventional. The pile light filter elements 2 are similar to those described above except that the light diffusing scratches are missing from its outer surface. Right next to this filter pile is a collector grid 17. A short distance away is the two-sided mosaic 18. Paraxial rays projected by the usual image forming optical lens system enter the light filter on its outer side and the primary color components of the formed image reach the mosaic substantially on the surface area adjacent to each filter. Electron beam 7 impinges on the other side of mosaic. This electron beam is made to pass through electron lenses systems 11, 12, and 13 in the manner described and illustrated in Fig. 3.

The operation of this two-sided mosaic is conventional except that the electron beam is concentrated by the electron lenses at any moment on the part of the mosaic which is illuminated through one light filter only. There is a 4 mc. oscillator with three phase output connected to these electronic lens elements as described above. It results in the concentration of the beam for 1/12 microsecond on one color and for an equal length of time on each of the other two colors. Otherwise, the operation is carried on in the conventional manner.

If the usual gage screen is used for the mosaic it is advisable to increase each dimension of the mosaic plate by a factor of three. This is preferable, though not absolutely necessary, since there are three times as many picture elements horizontally when using the system as described, than with the usual black and white systems. Increasing the gauge of the screen to get 1/3 as large elements would of course result in the same quality, without increased size.

The image multiplier orthicon is also adaptable for use in the above described color pick up system. In this tube there is a semi-transparent photocathode. The picture is projected onto one side of this photocathode while the other side emits electrons. A color filter, such as shown in Fig. 2, may be interposed between the optical system and the photocathode without materially affecting the functioning of the tube. The electron beam impinges on a thin sheet of glass called the target. It is possible to place an electron lens system, such as shown in Fig. 3 ahead of this target and so to concentrate the beam on definite areas of the target. However, the returning beam may have to be picked up by a screen near the target.

No circuit diagrams accompany this description as a number of conventional circuits are applicable.

While I have illustrated and described above embodiments of the invention, it should be understood that the invention is not to be limited to the particular embodiments disclosed herein. Modifications apparent to one skilled in the art are to be considered part of the invention as defined in the accompanying claims.

What is claimed is:

1. In combination in a cathode ray tube, a luminescent screen and an electronic lens beam deflecting system, the said screen comprising a plurality of light filter groups arranged in parallel to form color filter line elements, the filter elements of each group constituting colored transparent material transmitting one primary color, a film of fluorescent material adjacent to an inner edge face of each of said filter elements, the said electron lens system comprising a plurality of independent line lens elements of mutually insulated lens groups arranged in parallel, each group being relatively longitudinally spaced in different parallel transverse zones and the lens elements of each group being laterally displaced with respect to the corresponding elements of the other groups, the said luminescent screen with the said film of fluorescent material and the said lens groups in longitudinally spaced parallel arrangement being positioned in the path of the scanning beam, each group of lenses being positioned to direct the beam towards the film adjacent a group of filter elements different from those towards which the other groups of lenses direct the beam.

2. In combination in an image forming cathode ray tube, a color filter screen composed of a plurality of juxtapositioned narrow line light color filter elements, each element transmitting one of the three primary colors and every third element transmitting the same primary color, a luminescent film at the inner face of the said filter elements, and a respective group of cathode beam deflecting line elements for each group of the same primary color filters positioned in parallel relation to the filter line elements of their corresponding group but with the different groups of deflecting elements longitudinally differently positioned and longitudinally spaced from each other, the said screen, the said luminescent film, and the said groups of beam deflecting elements being positioned in successive longitudinal positions and in the path of the cathode scanning beam of the said tube.

3. In combination in a television pick up signal generating cathode ray tube, a selective primary color pile light filter screen comprising a plurality of juxtapositioned narrow line elements of colored transparent materials, an electron collector grid positioned at the inner side of said screen, a two sided electron emitting mosaic upon which an optical image of the object whose picture is to be transmitted may be formed positioned adjacent the inner side of said grid, and a respective group of cathode beam deflecting line elements for each primary color group of filters positioned in parallel relation to the filter line elements of their corresponding group but with the different groups of deflecting elements longitudinally differently positioned and longitudinally spaced from each other, the said light filter screen, the said collector grid, the said mosaic, and the said groups of beam deflecting elements being positioned in successive longitudinal positions and in the path of the cathode scanning beam of the said tube.

LOUIS W. PARKER.

References Cited in the file of this patent

UNITED STATES PATENTS

| Number | Name | Date |
|---|---|---|
| 2,307,188 | Bedford | Jan. 5, 1943 |
| 2,446,249 | Schroeder | Aug. 3, 1948 |
| 2,446,440 | Swedlund | Aug. 3, 1948 |
| 2,446,791 | Schroeder | Aug. 10, 1948 |
| 2,461,515 | Bronwell | Feb. 15, 1949 |
| 2,498,705 | Parker | Feb. 28, 1950 |
| 2,529,485 | Chew | Nov. 14, 1950 |
| 2,532,511 | Okolicsanyi | Dec. 5, 1950 |

FOREIGN PATENTS

| Number | Country | Date |
|---|---|---|
| 443,896 | Great Britain | Mar. 10, 1936 |
| 866,065 | France | Mar. 31, 1941 |